March 6, 1956 R. G. MILLER 2,737,309
SPHERICAL ENCLOSURE
Filed Oct. 1, 1951 5 Sheets-Sheet 1

INVENTOR
Roy G. Miller
By Pierce, Scheffler & Parker
ATTORNEYS

March 6, 1956 R. G. MILLER 2,737,309
SPHERICAL ENCLOSURE
Filed Oct. 1, 1951 5 Sheets-Sheet 2

INVENTOR
Ray G. Miller
BY Pierce, Scheffler & Parker
ATTORNEYS

March 6, 1956  R. G. MILLER  2,737,309
SPHERICAL ENCLOSURE
Filed Oct. 1, 1951  5 Sheets-Sheet 3

INVENTOR
Roy T. Miller
BY Pierce, Scheffler & Parker
ATTORNEYS

March 6, 1956 R. G. MILLER 2,737,309
SPHERICAL ENCLOSURE
Filed Oct. 1, 1953 5 Sheets-Sheet 4

INVENTOR
Roy G. Miller

BY Pierce, Scheffler & Parker
ATTORNEYS

March 6, 1956  R. G. MILLER  2,737,309
SPHERICAL ENCLOSURE
Filed Oct. 1, 1951  5 Sheets-Sheet 5
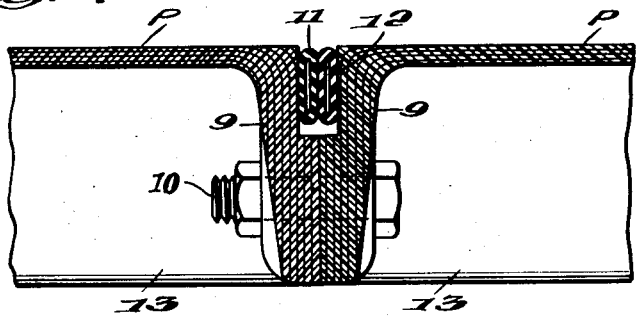
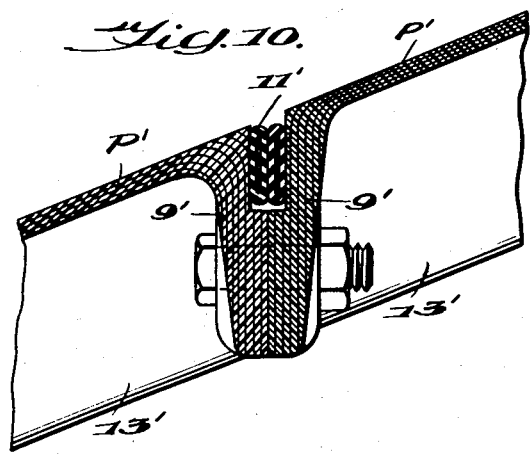
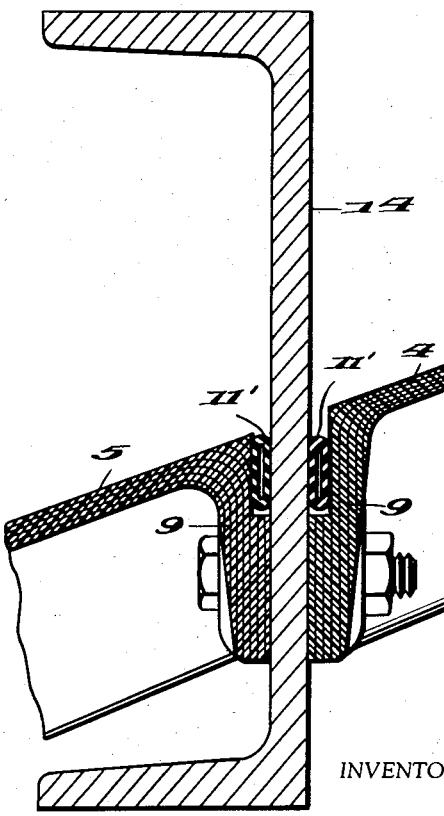
INVENTOR
Roy T. Miller
BY Pierce Scheffler & Parker
ATTORNEYS United States Patent Office 2,737,309
Patented Mar. 6, 1956

2,737,309

SPHERICAL ENCLOSURE

Roy G. Miller, Bayside, N. Y., assignor to East Coast Aeronautics, Inc., New York, N. Y., a corporation of New York Application October 1, 1951, Serial No. 249,137

4 Claims. (Cl. 220—1)

The present invention relates to hollow enclosures of the spherical type and more particularly to a novel and improved arrangement for constructing the same from a plurality of spherical quadrangular panels.

The invention offers the following advantages:

(a) Convenience and economy in the manufacture of the panels;
(b) Compactness of the panels to facilitate transportation and handling;
(c) Simplicity and economy in erection;
(d) Greater overall strength attributable to staggered arrangement of joints between panels; and
(e) Adaptability to hemispheres and other spherical segments as well as complete spheres.

Enclosures of the spherical type have long been known as the most stable of all shapes for supporting either internal or external pressures. As a shelter, in the from of a hollow hemisphere or a spherical segment whose base line extends parallel to but is of less diameter than that of a great circle on the sphere, it provides a maximum enclosed volume with a minimum of surface area and hence weight, two factors most important when transport is required as in military operations where bases may be required to be set up in any part of the world.

As a tank for storage of liquids, gases or finely divided solids, the sphere offers optimum strength for resisting internal pressures.

Prior to my invention, division of a spherical shell into structural elements has followed symmetrical patterns of two general lines, one being division by lines of latitude and longitude as in a globe, and the other divisions corresponding to regular polyhedrons. The first is extremely limited as to the number of divisions without excessive variety of panels. The second results in an awkward panel of equal width and length, and is also limited as to the number of divisions without excessive panel variety.

With my invention, however, it becomes possible to make up a spherical enclosure from a plurality of spherical quadrangular panels more oblong in shape than square and which when put together provide staggered joints for increased strength. Moreover, according to the basic inventive concept which stems from a novel, unsymmetrical division of an equilateral spherical triangle into three identical oblong spherical quadrangular panels, spherical shelters or tanks may be made from panels of a single variety only or in certain cases from a few varieties of oblong panel shapes where shelters of comparatively large diameter are required and a truly hemispherical shape would be impractical because of the unnecessary excess of head-room it would provide.

With reference now to the accompanying drawings wherein typical embodiments of the improved construction are shown:

Fig. 9 is a section on line 9—9 of Fig. 3 showing the panel construction and joint seal between adjacent panels when the division lies on a great circle;

Fig. 10 is a similar section on line 10—10 of Fig. 5 showing the panel and joint construction between edges of adjacent panels where such edges lie on small circles;

Figure 7:
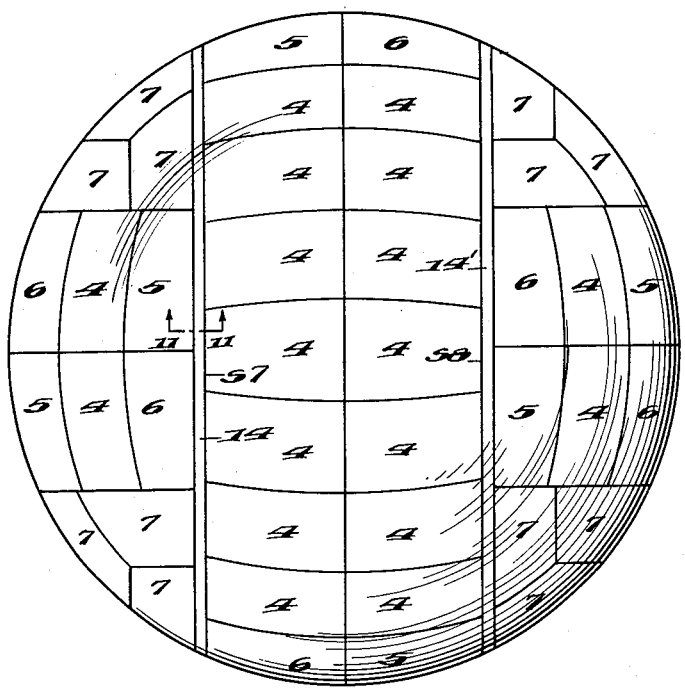
Figs. 7 and 8 are likewise top plan and elevation views, respectively, of still another embodiment which is a variant of the embodiment shown in Figs. 5 and 6.

Fig. 11 is a section on line 11—11 of Fig. 7 showing a convenient method for incorporating a structural arch for reinforcing purposes into the assembly of a large spherical segment; and Fig. 12 is a section through adjacent panels in the vicinity of a joint showing how adjacent panels of a pressure tight hollow sphere for storage of gas or liquid arranged in accordance with the invention may be joined together.

Figure 1:
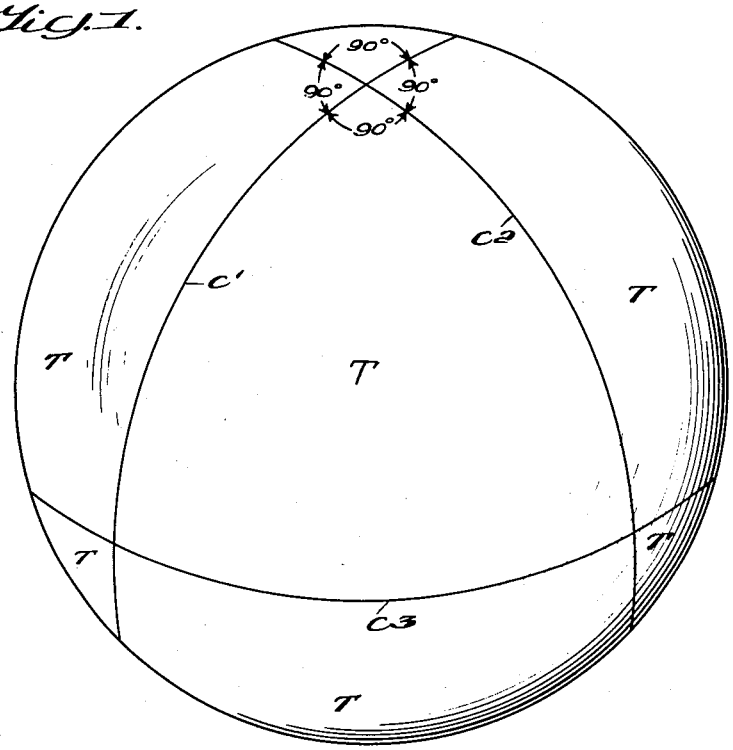
Fig. 1 is a view of a sphere divided into quadrantal triangles.
Figure 2:
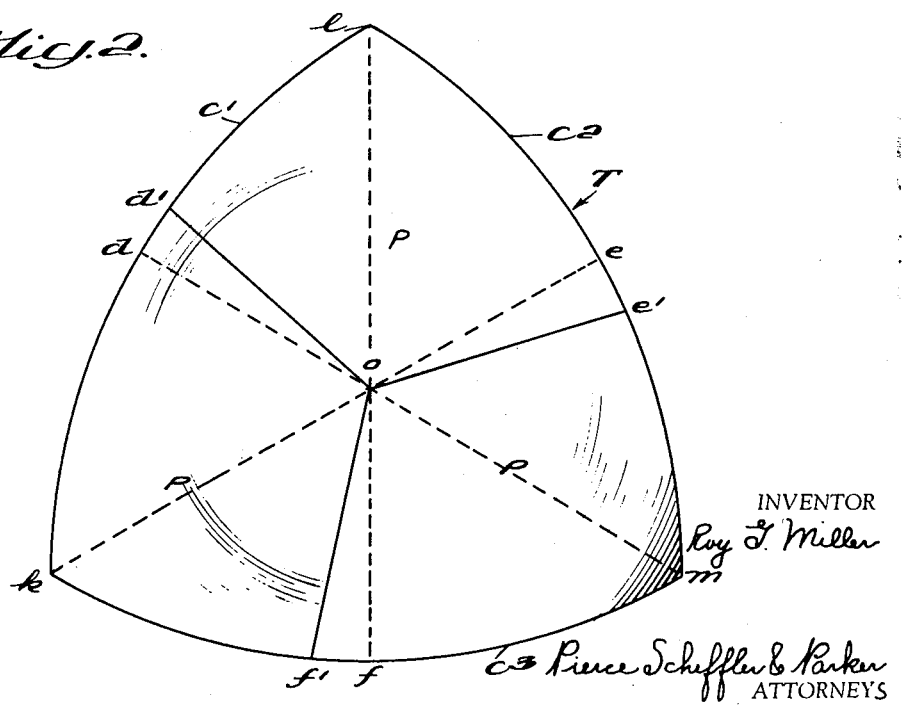
Fig. 2 is a radial view of one of the quadrantal triangles shown in Fig. 1, illustrating both the conventional and my improved way of dividing each such triangle unsymmetrically into three identical spherical quadrangular panels.

In Fig. 1, the sphere there shown is divided by three mutually perpendicular great circles C1, C2 and C3 into eight equilateral quadrantal spherical triangles T. The conventional method of dividing each of the triangles T is shown best in the radial view of Fig. 2 by the broken lines d—o, e—o and f—o. These lines lie respectively on great circles that bisect the three angles of the triangles, thus dividing the triangle into three identical quadrangular panels o—f—k—d—o, o—f—m—e—o, and o—e—l—d—o. Point o which lies at the intersection of the lines bisecting the angles of the triangle constitutes the center of area of the triangle. Each of these panels is more square than oblong, however, which makes it less convenient for handling and transportation. Moreover, since the lines of division o—f, o—d and o—e of each triangle bisect the great circles which bound the triangle, it is obvious that the panel corners of adjacent triangles will all come together at common junction points which is not in the best interest of maximum structural strength.

According to the present invention, it is proposed to divide the spherical triangular surface unsymmetrically along the solid lines o—f', o—d' and o—e'. Preferably these lines lie on small circles parallel in each case to the circle, the latter being a great circle in the case of a quadrantal triangle, that forms the opposite boundary of the quadrangular panel. This division results in quadrangular panels which are identical and of uniform width, but now considerably elongated, making them more convenient to handle and transport. It should be noted in particular that side d'—l can thus be made substantially shorter than the corresponding side d—l of the symmetrical panel. The latter is particularly advantageous since the width of the panel is the limiting dimension involved in passing the panel through doorways and other access openings or in transport of the panel over highways or railroads. Thus for a limitation in width of eight feet which is about the standard for transport via railroads, aircraft and trucks, the present invention makes it possible to construct a shelter corresponding to a sphere having a diameter of twenty-six feet whereas with a symmetrical division of a spherical triangular surface, the same eight foot limitation in width would limit the shelter to a size corresponding to a sphere having a diameter of only twenty-one feet.

Figure 3:
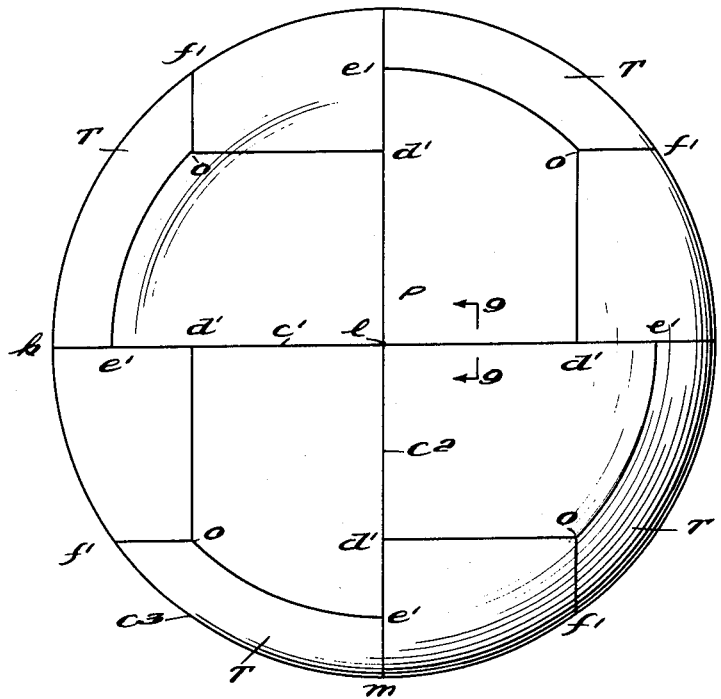
Figs. 3 and 4 are top plan and elevation views, respectively, of a hemispherical enclosure made up from four spherical quadrantal triangular surfaces, each of which is divided unsymmetrically into three identical quadrangular panels.
Figure 4:
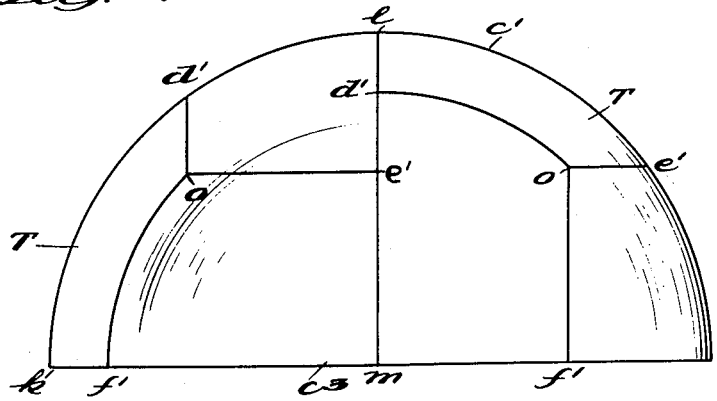

Figs. 3 and 4 illustrate an application of this inventive concept to the division of a hollow hemisphere into twelve identical panels. A complete sphere by this method would of course consist of twenty-four such panels. Besides the advantages of an oblong panel already explained, it will be observed that the panel corners of adjacent quadrantal triangles no longer merge in a common junction point but rather are staggered with respect to each other which increases the strength factor materially. The three cornered joints between the panels of each triangle at the center of area points $o$ cannot be avoided but at all other corner joints along the great circle C1 and C2 except for the pole point $l$ only two corners come together as compared with the four cornered joints which obtain in the case of a symmetrical division of the triangle.

This basically new concept of unsymmetrical division need not be limited to quadrantal triangles but may be utilized in dividing any equilateral spherical triangle whether bounded by great circles or small circles. Thus for example in designing a spherical enclosure where a large floor area is desired without including an unnecessary amount of head-room, the embodiment shown in Figs. 5 and 6 may be utilized.

In this form of the invention, not all panels can be identical in shape but there are only three varieties required. An appreciable portion of the surface area is constituted by two sets of spherical rectangles arranged at a normal to each other, the rectangles being of two varieties, designated by the numerals 1 and 2, which are of the same width but of different lengths. The sides of the rectangles are bounded by small circles S1, S2, S3, S4 and S5 located parallel to and at a distance H from the great circles C4, C5 and C6 shown in broken lines, and the ends of the rectangles are also bounded by these same small circles and in some cases by great circles. Both ends of the two rectangular panels 1 are bounded by great circles while each of the six other rectangles 2 have one end bounded by a great circle and the other by a small circle. The geometric requirement of the construction is that the width of the panels 1—2 shall be equal to twice the distance H of the base line S5 of the spherical segment from the spherical equatorial circle C6 as indicated on the drawing.

The residual surface area is constituted by four equilateral triangle T' each divided unsymmetrically as in the case of the construction shown in Figs. 3 and 4 into three identical quadrangular panels 3. Unlike the quadrantal triangles T in Figs. 3 and 4, the triangles T' are each bounded by the small circles S1–S5, and the division lines which radiate from the center of area point $o'$ of each triangle for dividing the same into quadrangular panels lie along arcs of other small circles which extend parallel to the arcs of the small circles S1–S5 which define the sides of the triangles.

Figure 5:
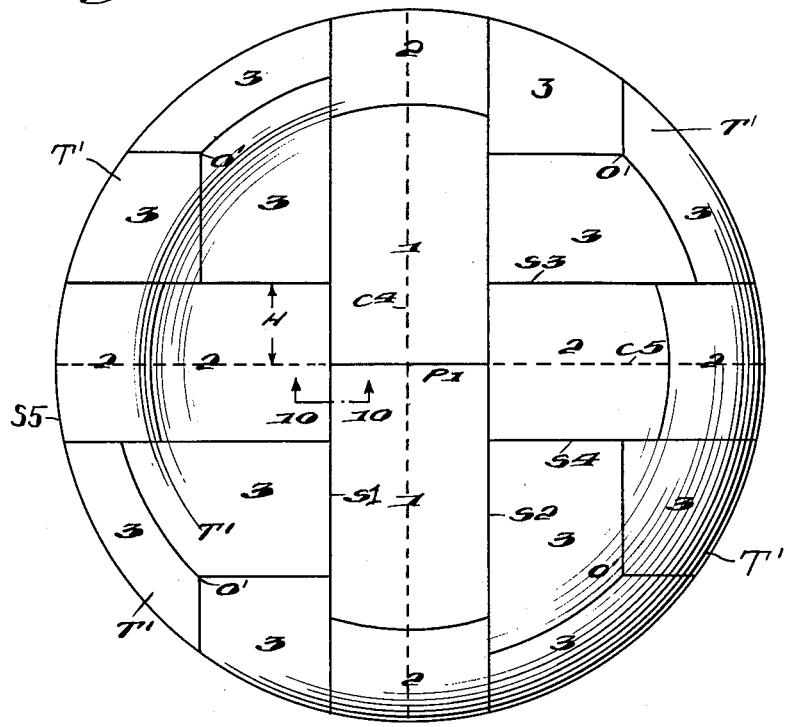
Fig. 5 and 6 are also top plan and elevation views, respectively, of a modified construction especially adapted for larger sized structures and which does not provide excessive head-room.
Figure 6:
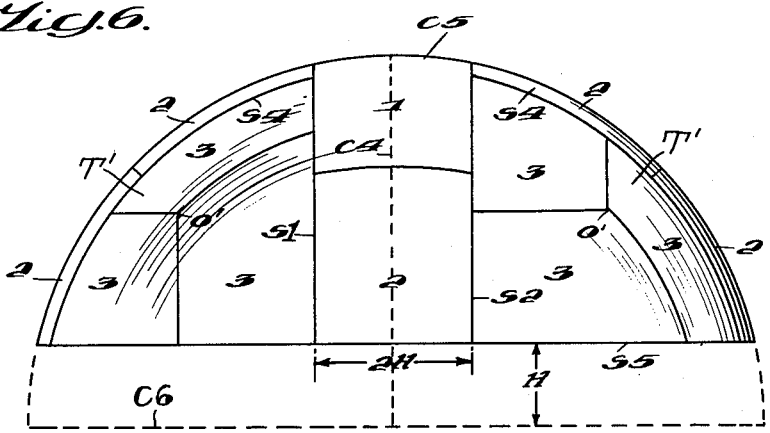

A total of twenty panels are required to make up the assembly shown in Figs. 5, 6, there being two panels of type 1, six panels of type 2 and twelve panels of type 3. A complete sphere may be built from two such assemblies joined together by eight of the type 1 panels.

Figure 8:
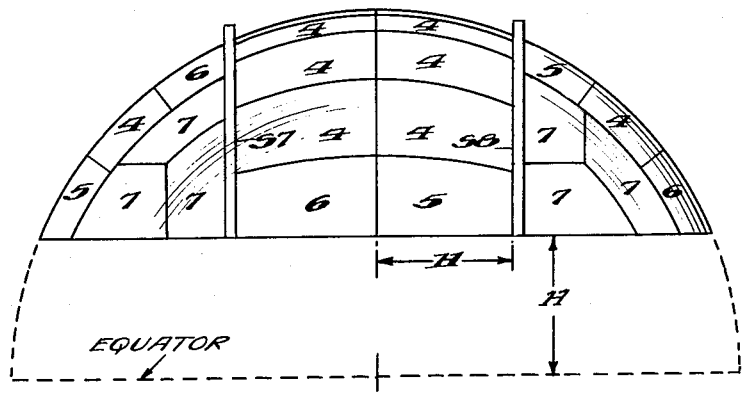

The arrangement shown in Figs. 7 and 8 is similar to that shown in Figs. 5, 6, but is especially adapted for still larger spherical segments. Here the major portion of the spherical surface is divided into spherical rectangles of convenient size and the remainder is constituted by spherical triangles each divided unsymmetrically into three identical quadrangular panels 7. The rectangular panels are in three varieties 4, 5 and 6. The entire assembly requires a total of forty-two panels of the four types comprising eighteen of type 4, six of type 5, six of type 6 and twelve of type 7. Two of these assemblies joined by a band of forty-eight type 4 panels would form a complete sphere.

As explained at the outset, the inventive principles herein disclosed may be applied to the construction of domed spherical segments to serve as a shelter or of complete spheres to provide storage tanks and the like.

If constructed as a shelter, and particularly a portable one adapted to be erected or knocked down by means of releasable fastener means as distinguished from the usual "permanent" type of erection, the basic panel and joint arrangement shown in Fig. 9 and as described and claimed in my copending United States application Ser. No. 237,320, can be utilized. Here it is seen that each of the panels P is provided with a peripheral flange 9, the flanges being butt jointed by means of a plurality of spaced bolts 10 or equivalent reelasable fastener devices. To render the joints airtight each panel is provided with a peripheral tubular sealing gasket 11 of rubber set into a recessed portion 12 of the flange 9. When the flanges of adjacent panels are brought together, the rubber gaskets 11 are likewise pressed together and form an airtight seal all along the joint. The recessed portion 12 provides some measure of protection for the gasket in transit and also minimizes rupture thereof when under pressure. Preferably the panel should have a highly favorable strength-weight ratio and is therefore molded from fiber glass lamina bonded with a thermosetting synthetic resin binding agent. The panel may also include transverse ribbing 13 for additional strength. The joint structure of Fig. 9 is best usable where the division line between panels is a great circle such as in Fig. 3, the plane of cleavage passing through the center of the sphere.

For joining panels P' when the division line is along a small circle such as in Fig. 5 the panel flanges 9' are best arranged as in Fig. 10 to lie in a plane of cleavage parallel to but offset from a great circle.

In the case of very large shelters of the type shown in Figs. 5–8 it may be desirable to incorporate structural metal arch members for additional strength. Such arch members may be included along any line of division which is continuous. Fig. 11 shows one practical arrangement as applied to Fig. 7. Here the arch 14 extends along the small circle S7 in the form of a channel standing on edge with its web portion clamped between adjacent panels which come together along the small circle S7 and is weatherproofed by sealing gaskets 11' carried by the panel flanges and compressed between the flange and opposite faces of the arch 14. A second reinforcing arch 14' also extends along the arc of the small circle S8. In a similar manner, reinforcing arches could be incorporated in the Fig. 5 construction along the small circles S1, S2.

If the principles of the invention are employed in constructing a permanent sphere, adjacent panels P'' may be formed as shown in Fig. 12 by welding their edges together as at 15.

In conclusion, I wish it to be understood that the specific embodiments illustrated are to be viewed only as typical rather than limitative and hence various other arrangements of spherical segments are possible within the scope of the invention as defined in the appended claims, and which would include spherical triangular surfaces divided unsymmetrically as aforesaid.

I claim:
1. As a structural element, a quadrangular panel having arcuate inner and outer surfaces, the configuration of said panel conforming to one of three identical surface elements obtained by division of an equilateral spherical triangular surface unsymmetrically by arcs of three circles extending along said surface from a common pole point at the center of area of said triangular surface to the sides of said triangular surface and which intersect said sides at like distances in the same direction from the mid points thereon to establish a substantially uniform width for the panel and wherein the spherical triangular surface from which the configuration of said panel is determined is bounded by arcs of great circles.

2. A hollow spherical structure comprising four interconnected quadrantal spherical triangular surfaces each bounded by arcs of great circles, each said triangular surface being composed of three identical interconnected quadrangles the adjoining sides of which are bounded by arcs of three small circles extending along said surface from a common pole point established at the center of area of the quadrantal triangle to the sides of said triangular surface and which circular arcs intersect said sides at like distances in the same direction from the midpoint thereon.

3. A hemispherical structure as defined in claim 2 wherein each of said circular arcs extends parallel to the arc of the great circle that defines the opposite edge of a quadrantal panel.

4. A hollow sphere comprising two hollow hemispherical structures of the type defined in claim 2 interconnected along their base lines.

References Cited in the file of this patent

UNITED STATES PATENTS

| | | |
|---|---|---|
| 1,621,984 | Horton | Mar. 22, 1927 |
| 1,885,601 | Horton | Nov. 1, 1932 |
| 2,417,053 | Boardman | Mar. 11, 1947 |
| 2,427,676 | Horton | Sept. 23, 1947 |

FOREIGN PATENTS

| | | |
|---|---|---|
| 32,303 | Netherlands | Feb. 17, 1934 |